(12) United States Patent
Terwilliger et al.

(10) Patent No.: US 6,726,221 B2
(45) Date of Patent: Apr. 27, 2004

(54) DEAD LENGTH COLLET CHUCK ASSEMBLY

(75) Inventors: Donald N. Terwilliger, Elmira, NY (US); Neal R. Des Ruisseaux, Horseheads, NY (US); David B. Myers, Corning, NY (US)

(73) Assignee: Hardinge Inc., Elmira, NY (US)

(*) Notice: Subject to any disclaimer, the term of this patent is extended or adjusted under 35 U.S.C. 154(b) by 0 days.

(21) Appl. No.: 10/156,694

(22) Filed: May 29, 2002

(65) Prior Publication Data
US 2003/0222414 A1 Dec. 4, 2003

(51) Int. Cl.$^7$ ............................................. B23B 31/20
(52) U.S. Cl. ..................... 279/50; 279/46.9; 279/57; 279/157
(58) Field of Search .................... 279/49–50, 46.9, 279/157, 54–57

(56) References Cited

U.S. PATENT DOCUMENTS

| | | | | |
|---|---|---|---|---|
| 2,462,155 A | * | 2/1949 | Benjamin et al. | 279/50 |
| 3,539,193 A | * | 11/1970 | Parsons | 279/46.9 |
| 3,921,993 A | * | 11/1975 | Ingham et al. | 279/50 |
| 4,309,041 A | * | 1/1982 | Peterson et al. | 279/46.7 |
| 6,257,595 B1 | * | 7/2001 | Difasi et al. | 279/50 |
| 6,575,477 B2 | * | 6/2003 | Humphrey et al. | 279/46.7 |

* cited by examiner

Primary Examiner—Daniel W. Howell
(74) Attorney, Agent, or Firm—Pillsbury Winthrop

(57) ABSTRACT

A collet chuck assembly includes a mount, a selectively-axially-movable collet closing sleeve, and a multiple-segment collet head. The collet head includes two axially-spaced outer circumferential cam surfaces that engage two axially-spaced inner circumferential cam surfaces of the closing sleeve. A quick-release cap attached to the mount includes two inwardly-radially-extending tabs that engage two outwardly-radially-extending lips of the collet head to prevent the collet head from moving axially relative to the cap. Flat resilient collet seals are disposed between each set of adjoining collet segments to prevent debris from getting into the collet chuck assembly between the segments. The collet seals maintain full-surface contact with adjoining segments even when the collet head is fully opened. A slinger bore formed in the cap directs debris radially-outwardly out of the collet chuck assembly.

9 Claims, 5 Drawing Sheets

DEAD LENGTH COLLET CHUCK ASSEMBLY

BACKGROUND OF THE INVENTION

1. Field of the Invention

The present invention relates to a collet chuck assembly for holding a tool or workpiece on a spindle of a turning machine.

2. Description of Related Art

Collets chucks are used in various machine tools such as lathes for clamping or gripping workpieces or tools. Collet heads include a plurality of circumferentially-spaced, workpiece-gripping segments and conical surfaces or cams, which, when the collet head is moved axially, interact with corresponding, opposing surfaces or cams on a mounting fixture or on the spindle. This interaction causes the workpiece-gripping segments of the collet head to contract or expand to grasp or release a workpiece or tool, depending on the direction of movement. Collet chucks have commonly been used in machine tools in place of other types of chucks. Collet chucks are typically more accurate and have a greater gripping characteristic than a typical jaw chuck, for example. Another advantage of collets is that they continue to grasp the workpiece or tool even at high rotational speeds when jaw chucks would have a tendency to loosen their grip due to centrifugal force.

One problem with such conventional collet chucks is that the required axial movement of the collet head axially moves the workpiece or tool as well. Consequently, slight variations in the diameter of the workpiece or tool could cause the collet to position the workpiece differently. When and where a collet will grasp a work piece depends on the difference in diameter between the open collet and the diameter of the workpiece. Precise workpiece diameter is therefore required if the workpiece is to be positioned precisely and consistently in machining operations such as facing, side finishing or cutting to precise lengths.

One conventional way of eliminating such axial movement is by using dead length collet chucks. In such chucks, the collet head is held in an axially-fixed position. A selectively axially-movable collet closing sleeve having a cam surface that engages the cams of the collet head is moved axially, instead of the collet head, to close and open the collet head. The closing sleeve is typically moved forwardly to close the collet head and rearwardly to open the collet head. Unfortunately, the collet head may have a tendency to occasionally stick to the collet closing sleeve when the sleeve is retracted to open the collet head. In such instances, the collet head tends to move axially-rearwardly with the collet closing sleeve. This results in the collet head not opening.

A conventional collet chuck typically extends over a substantial length in an axial direction of an associated machining tool (i.e. in a direction that extends along a rotational axis of the collet chuck). Consequently, the collet chuck intrudes into a machining envelope (work space) of the machining tool and limits the length of a workpiece or tool that can be held in the machining tool.

A conventional collet chuck typically has a small gripping diameter range (i.e., a small variation between the fully open and fully closed grip diameters). This small gripping range disadvantageously limits the chuck's ability to grip stock (workpieces or tools) that has a diameter that varies from the intended gripping diameter. Accordingly, there is a need in the art for a collet chuck that can effectively grip variously-sized stock.

Another problem encountered by conventional collet assemblies is that collet seals that are disposed between the collet segments may not always be in complete contact with their adjoining collet segments. Consequently, debris can enter the collet chuck assembly between the segments.

SUMMARY OF THE INVENTION

One aspect of the present invention provides an improved collet head and collet chuck assembly.

Another aspect of the present invention provides a collet chuck assembly that simplifies collet head changing.

A further aspect of the present invention provides a collet chuck assembly with a double angle, outside diameter collet head.

A further aspect of the present invention provides a collet chuck assembly for holding a tool or work piece on a spindle of a turning machine. The collet chuck assembly has a mount having a front end and a rear end adapted to be connected to the spindle. The mount has an axial opening extending therethrough. An axially-extendable collet closing sleeve is disposed within the axial opening of the mount. The collet closing sleeve has a plurality of axially-spaced tapered inner surfaces. A collet head is disposed radially-inwardly from the collet closing sleeve. The collet head has a plurality of axially-spaced tapered outer surfaces that engage the tapered inner cam surfaces of the collet closing sleeve. The collet head has an inner order hole. Axial movement of the collet closing sleeve forces each of the outer surfaces of the collet head radially-inwardly, thereby reducing the inner diameter of the order hole.

A further aspect of the present invention provides a collet head having a plurality of circumferentially-spaced segments, each segment of which defines a portion of each of a plurality of axially-spaced circumferential cam surfaces. Each segment has surface portions disposed adjacent to corresponding surface portions of adjacent segments. The collet head also has resilient flat collet seals disposed between the adjacent surface portions.

A further aspect of the present invention provides a collet chuck assembly for holding a tool or work piece on a spindle of a turning machine. The collet chuck assembly has a mount with a front portion and a rear portion adapted to be connected to the spindle. The mount has an axial opening extending therethrough. An axially-extendable collet closing sleeve is disposed within the axial opening of the mount, the collet closing sleeve having a first cam surface. The collet chuck assembly also includes a radially-expandable collet head, which has a second cam surface that engages the first cam surface, and at least one lip having a third surface. The collet chuck assembly also has a cap that mounts to the front portion of the mount and engages the collet head to prevent the collet head from moving axially-forwardly. The cap has at least one tab with a fourth surface that engages the third surface of the lip of the collet head to prevent the collet head from moving axially-rearwardly. The fourth surface of the at least one tab and the third surface of the at least one lip are disposed axially forward from a forward portion of the sleeve.

A further aspect of the present invention provides a collet chuck assembly that has a mount with a front portion and a rear portion adapted to be connected to a spindle. The mount has an axial opening extending therethrough. A collet head is disposed radially-inwardly from the collet closing sleeve, the collet head defining an inner order hole. A cap mounts to the front portion of the mount and has a radially-extending slinger bore that opens into a space between the collet head and the mount. The slinger bore is adapted to direct debris outwardly out of the space between the mount and the collet head.

Additional and/or alternative objects, features, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

Figure 1:
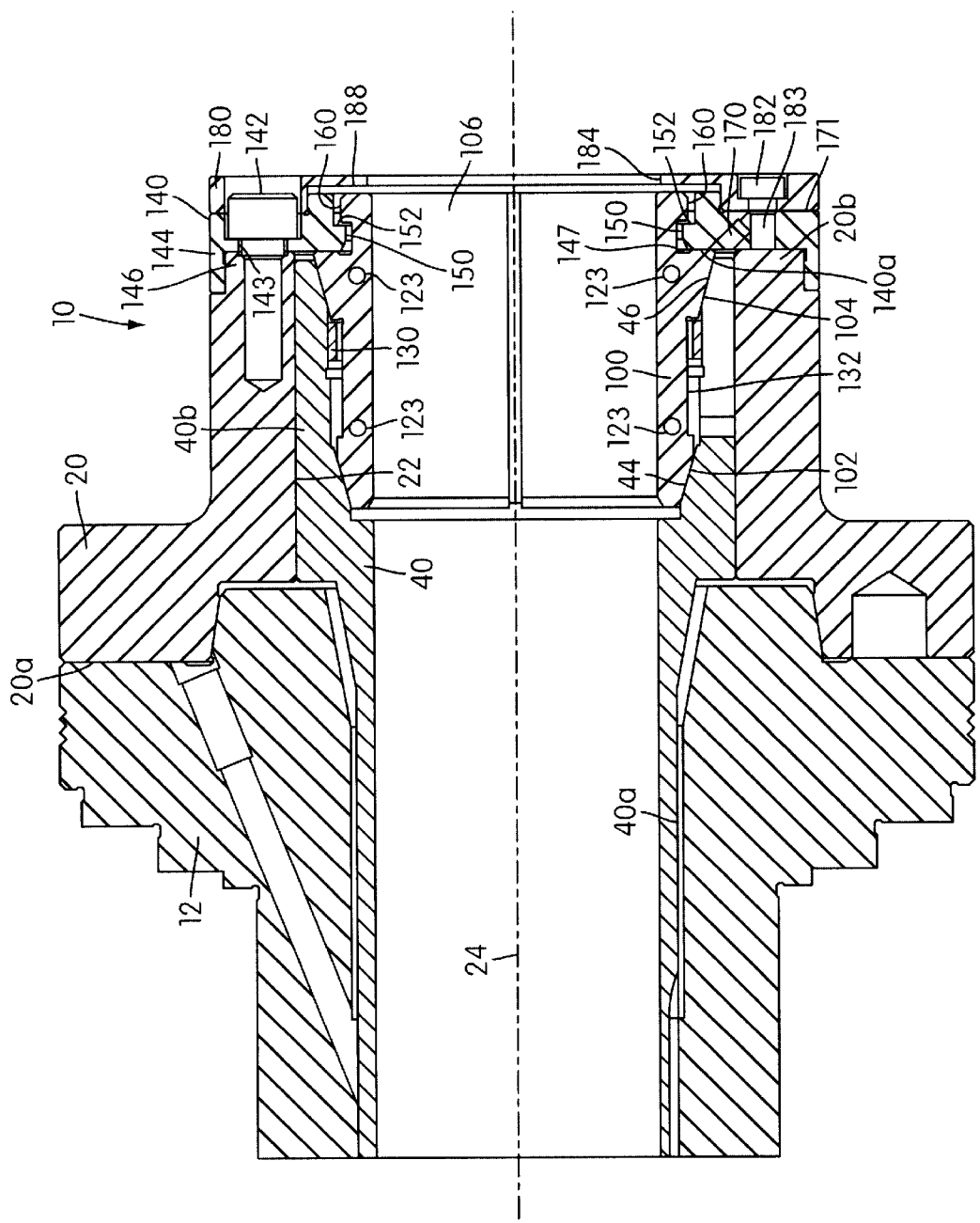
FIG. 1 is a partial cross-sectional view of a collet chuck assembly according to a preferred embodiment of the present invention.

As illustrated in FIG. 1, a collet chuck assembly 10 according to the present invention for holding a tool or workpiece is mounted to a machine spindle 12 and draw bar (not shown) of a turning machine such as a lathe.

A mount 20 of the collet chuck assembly 10 includes a rearward end 20a that is rigidly connected to the spindle 12 and a forward end 20b. The mount 20 includes an inner axially-extending bore 22 that is aligned with an axis 24 of the spindle 12. The axis 24 defines the axial direction of the assembly 10. The forward and rearward directions extend along the axis 24 to the right and left, respectively, of FIG. 1.

A collet sleeve 40 is disposed inside the bore 22 of the mount 20 such that the sleeve 40 can slide axially within the bore 20 along the axis 24. A rearward end 40a of the sleeve 40 is preferably threaded onto a threaded portion of a selectively axially-extendable draw bar (not shown) of the turning machine, thereby axially coupling the sleeve 40 to the draw tube. A forward end 40b of the sleeve 40 includes two axially-spaced inner frustro-conical cam surfaces 44, 46. The surfaces taper radially-inwardly toward the rearward end 40a.

Throughout this description and the claims, the term cam surface shall mean a surface that is adapted to slidingly engage another surface. Such a surface may have a variety of shapes, as would be appreciated by one of ordinary skill in the art. In the illustrated embodiment, the cam surfaces 44, 46 are frustro-conical with constant rates of taper. However, the rate of taper may vary over the cam surface's axial length to create a curved cam surface. Alternatively, the rate of taper may vary such that the cam surface is hemisphere shaped.

A collet head 100 is disposed radially-inwardly from the sleeve 40. The collet head includes two outer frustro-conical cam surfaces 102, 104 that taper radially-inwardly toward the rearward end of the assembly 10. The outer cam surfaces 102, 104 of the collet head 100 engage the inner cam surfaces 44, 46, respectively, of the sleeve 40. An axially-extending order hole 106 is formed in the collet head 100. The order hole 106 is aligned with the axis 24 and is adapted to have a workpiece or tool inserted therein.

Figure 2:
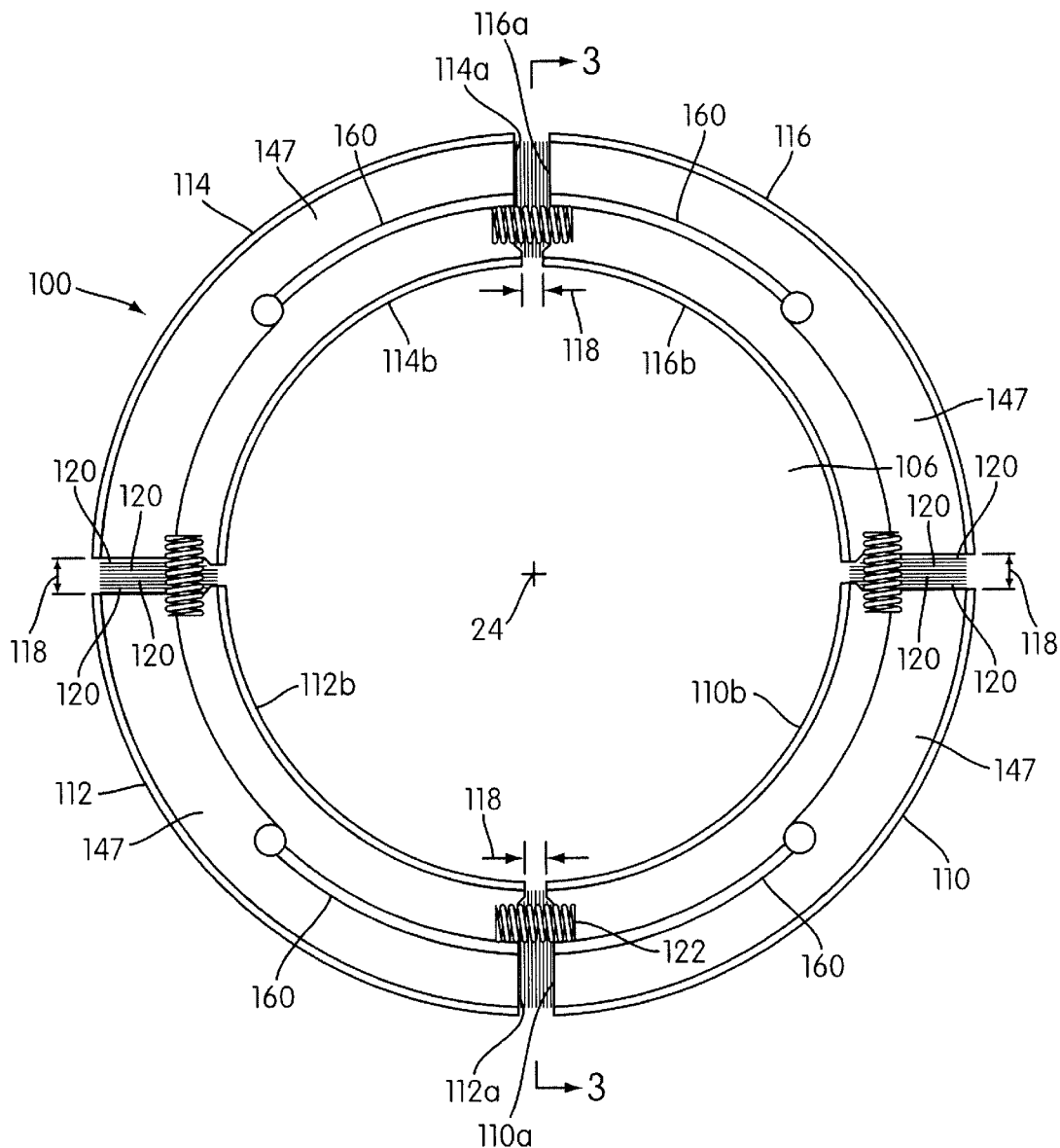
FIG. 2 is a front view of a collet head thereof.

As illustrated in FIG. 2, the collet head 100 is divided into four separate circumferentially-spaced segments 110, 112, 114, 116. Each segment 110, 112, 114, 116 defines a portion of each of the cam surfaces 102, 104. Similarly, inner arcuate radial surfaces 110b, 112b, 114b, 116b of the segments 110, 112, 114, 116 combine to define the order hole 106. A gap 118 is formed at each radially-extending and axially-extending intersection between adjoining segments 110, 112, 114, 116. The segments 110, 112, 114, 116 are constructed such that if the collet head 100 were to be completely closed and the gaps 118 eliminated, circumferential end surfaces 110a, 112a, 114a, 116a of adjoining segments 110, 112, 114, 116 would mate flushly with each other. For example, the surface 110a would mate with the surface 112a. As the collet head 100 is expanded, adjoining end surfaces 110a, 112a, 114a, 116a remain parallel such that the gaps 118 remain flat. Consequently, the thicknesses of the gaps 118 change evenly as the collet head 100 expands and contracts.

Figure 3A:
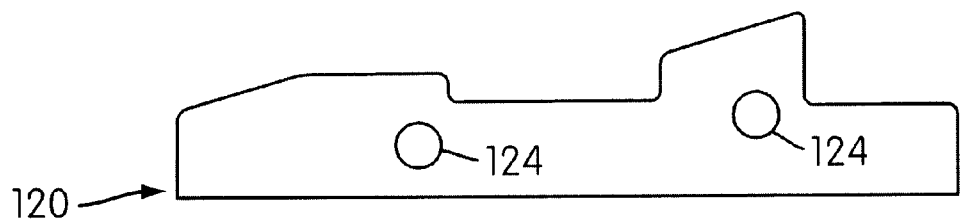
FIG. 3A is a cross-sectional view of a collet seal taken along the line 3—3 in FIG. 2 according to the present invention.

A plurality of collet seals 120 are disposed in each gap 118 to prevent debris that enters the order hole 106 from getting between the collet head 100 and sleeve 40 through the gaps 118. FIG. 3A is a cross-sectional view of a collet seal 120 taken along the line 3—3 in FIG. 2. As illustrated in FIG. 3A, the cross-sectional outline of the collet seal 120 preferably generally follows/mimics the lines of the end surfaces 110a, 112a, 114a, 116a. The collet seal 120 preferably comprises a resilient material such as foam urethane or closed cell foam. The collet seal 120 preferably has a constant thickness in a direction perpendicular to the cross sectional view in FIG. 3A when the collet seal 120 is uncompressed. Consequently, collet seals 120 can be easily constructed using flat sheets of resilient material. Thus, the construction of collet seals 120 is significantly simpler than the construction of conventional pie-piece-shaped collet seals.

A plurality of resilient members 122 are connected between adjoining segments 110, 112, 114, 116. The resilient members 122, in combination with the collet seals 120, provide a biasing force that tends to widen the gaps 118, thereby expanding/opening the collet head 100 and increasing the diameter of the order hole 106. In the illustrated embodiment, the resilient members 122 comprise mechanical compression springs. Each resilient member 122 is fit into opposing blind bores 123 drilled into the end surfaces 110a, 112a, 114a, 116a of two adjoining segments 110, 112, 114, 116. Each resilient member 122 is also fit through a corresponding hole 124 in the collet seals 120 disposed in the corresponding gap 118. Consequently, the resilient members 122 serve the dual functions of applying an opening/separating force to the collet head 100 and keeping adjoining segments 110, 112, 114, 116 and collet seals 120 aligned (i.e., substantially preventing adjoining segments 110, 112, 114, 116 and/or collet seals 120 from shifting radially or axially relative to each other).

Figure 3B:
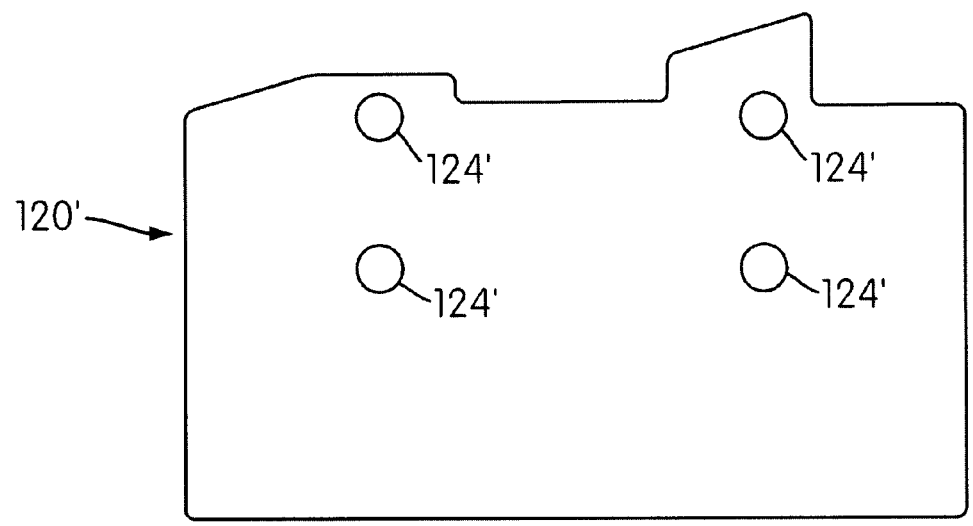
FIG. 3B is a cross-sectional view of a collet seal according to an additional embodiment of the present invention.

In the collet chuck assembly 10 illustrated in FIG. 1, the order hole 106 is relatively large. Accordingly, as is illustrated in FIGS. 1 and 3A, a radial width of the collet seals 120 is proportionally smaller and only two resilient members 122 and two corresponding holes 124 are used to stabilize the collet seals 120. Conversely, FIG. 3B illustrates a collet seal 120' that has a relatively larger radial width that is designed for use with a similar collet chuck assembly that has a relatively smaller order hole. To stabilize the larger collet seal 120', four spaced resilient members (not shown) fit into four spaced holes 124' in the collet seal 120' and corresponding blind bores (not shown) in corresponding segments (not shown).

The rearward engaging cam surfaces 44, 102 are axially-spaced from the forward engaging cam surfaces 46, 104, and all four cam surfaces 44, 46, 102, 104 have identical pitches (or rates of tapering). Consequently, forward and rearward ends of the collet head 100 close and open evenly such that a diameter of a forward end of the order hole 106 remains equal to a diameter of a rearward end of the order hole 106. Parallel opening and closing of the collet head 100 is further ensured by the resilient members 122, which are axially-spaced from each other. A resilient member 122 is preferably disposed at or near an axial position corresponding to each of the axially-spaced cam surfaces 102, 104. The resilient members 122 therefore tend to apply an equal separating/expanding force to the forward and rearward cam surfaces 102, 104 of adjoining segments 110, 112, 114, 116, thereby keeping the diameter of the order hole 106 and the thickness of the gaps 118 generally even over their respective axial lengths. Keeping the diameter of the order hole 106 parallel improves gripping power, workpiece stability, and accuracy of the grip of the assembly 10 over the entire working range of the collet chuck assembly 10.

Referring back to FIG. 1, an annular retaining ring 130 fits around the outer circumferential surface of the collet head 100 to hold the segments 110, 112, 114, 116 together and counteract the separating force of the resilient members 122 and collet seals 120 when the collet head 100 is not in the collet chuck assembly 10. The retaining ring 130 may be fit over the collet head 100 by holding the segments 110, 112, 114, 116 in a contracted/compressed/closed position such that sufficient clearance is created for the retaining ring 130 to be fit over the rearward end of the collet head 100 and positioned within an annular groove 132 formed on the outer circumferential surface of the collet head 100 between the cam surfaces 102, 104. Once the retaining ring 130 is mounted onto the collet head 100, each collet seal 120 maintains at least substantially full-surface contact with its adjoining collet seals 120 and/or end surfaces 110a, 112a, 114a, 116a even when the collet head 100 is in the fully open position. This full-surface contact prevents substantially all debris from entering the collet chuck assembly 10 through the gaps 118.

Worn out collet seals 120 that have lost their resilience may be easily replaced by removing the retaining ring 130 and replacing the worn out collet seals 120 with new collet seals 120.

An outer diameter of the retaining ring 130 is preferably slightly smaller than an inner diameter of the sleeve 40 at an axial location corresponding to the axial position of the retaining ring 130 such that when the collet head 100 is closed, the sleeve 40 generally engages the retaining ring 130 to prevent the ring 130 from rattling/jostling as the spindle 12 rotates.

While the illustrated collet head 100 includes four segments 110, 112, 114, 116, the collet head 100 may include a different number of segments without deviating from the scope of the present invention.

Figure 4B:
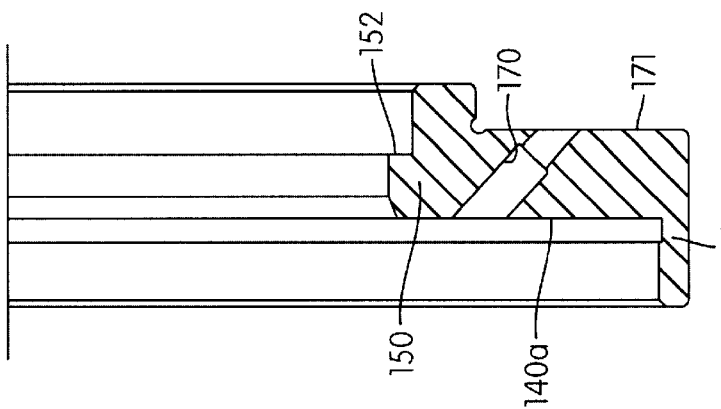
FIG. 4B is a sectional view of the cap illustrated in FIG. 4A, taken along the line 4B—4B in FIG. 4A.
Figure 4A:
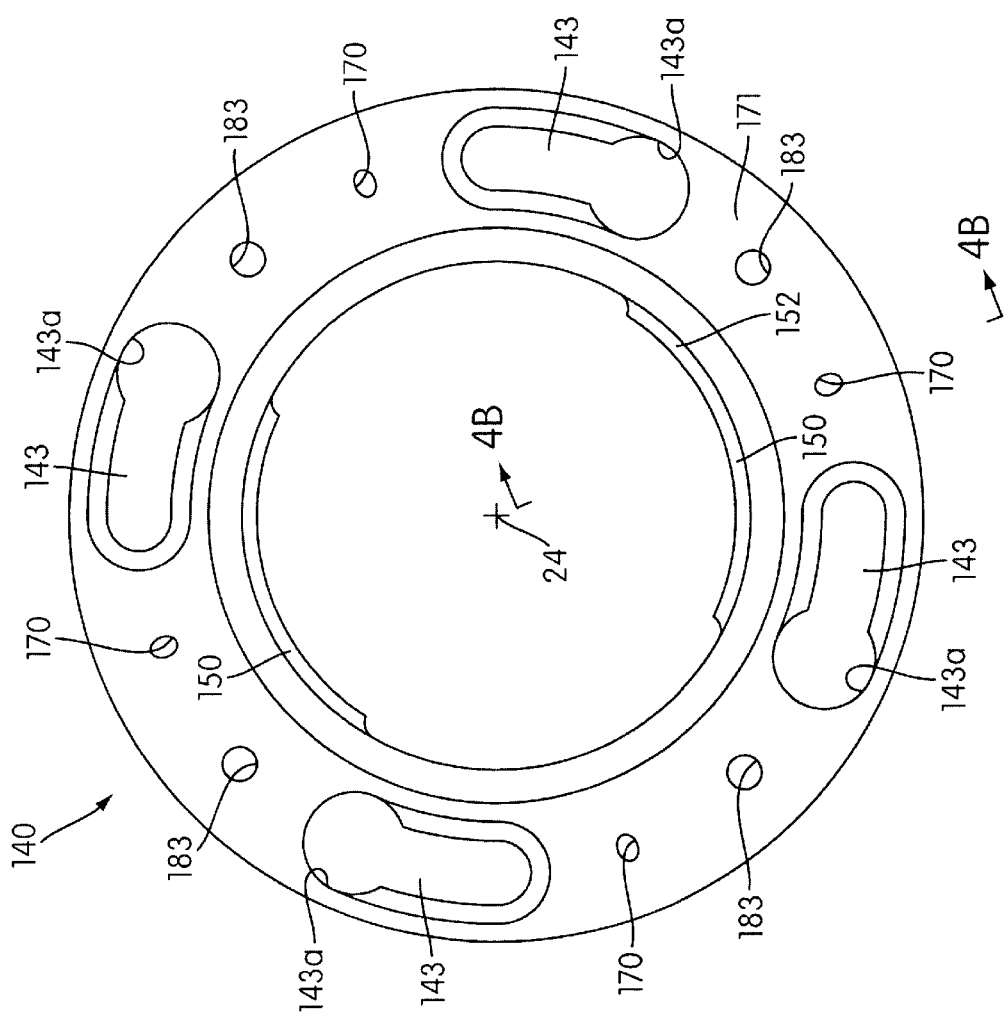
FIG. 4A is a front view of a cap of the collet chuck assembly illustrated in FIG. 1.

As illustrated in FIGS. 1 and 4, an annular cap 140 is releasably bolted to the front end 20b of the mount 20 with bolts 142 (only one is shown in FIG. 1). The cap 140 is preferably a quick-change cap 140 that doesn't require the bolts 142 to be removed completely to remove the cap 140. Rather, the bolts 142 need only be loosened enough to allow the cap 140 to be rotated partially until larger diameter portions 143a of circumferentially elongated bolt holes 143 (see FIG. 4A) in the cap 140 align with the bolts 142 such that the cap 140 can be removed axially-forwardly relative to the assembly 10. The quick-change feature is also advantageous because special tools are not required to remove the cap 140.

The cap 140 preferably includes an annular protrusion 144 that extends rearwardly from the main portion of the cap 140. The mount 20 includes an annular protrusion 146 that extends forwardly from a forward portion of the mount 20. The protrusion 144 is adapted to slide over the annular protrusion 146. A diameter of an outer circumference of the protrusion 146 is slightly smaller than a diameter of an inner circumference of the protrusion 144 such that when the cap 140 is pressed axially-rearwardly toward the mount 20, the mating engagement of the protrusions 144, 146 ensures that the cap 140 properly aligns with the mount 20 and axis 24. The automatic alignment ensures that the cap 140 can be quickly and accurately attached to the mount 20. The protrusion 146 may be integrally formed with the mount 20 or, as illustrated, may be a separate piece that is bolted (or otherwise attached) to the mount 20 before the cap 140 is attached. While the disclosed embodiment employs mating protrusions 144, 146 to ensure that the cap 140 is aligned properly, any other type of alignment device that would be understood by one skilled in the art to aid in quickly aligning the cap 140 with the mount 20 could also be used without departing from the scope of the present invention.

It should be noted that throughout this description and the claims, the phrases rearwardly-extending, radially-extending, forwardly-facing, etc. are not intended to be limited to solely the identified direction. Rather, such phrases merely mean that the direction includes a component in the stated direction. For example, as discussed above, the annular projection 144 extends rearwardly from the main portion of the cap 140. While in the illustrated embodiment, the protrusion 144's extension includes only a rearward component, this description and the attached claims are not so limited. Rather, the protrusion 144 could include both a rearwardly-extending component and a radially-outwardly-extending component (such that the protrusion 144 has a funnel shape) without departing from the scope of the present invention or the phrase "rearwardly extending." Similarly, a "rearwardly-facing" surface need only have a rearwardly-facing component. Consequently, unless otherwise explicitly stated herein, a stated direction requires only that the direction include a component that is aligned with the stated direction.

As illustrated in FIGS. 1 and 4A, a rearward face 140a of the cap 140 mates with a forwardly-facing surface 147 on each of the segments 110, 112, 114, 116 of the collet head 100 to prevent the collet head 100 from moving axially-forwardly when the sleeve 40 is moved axially-forwardly to close the collet head 100. Because the collet head 100 cannot move forward (to the right as illustrated in FIG. 1), the cam surfaces 44, 46 of the forwardly-moving sleeve 40 force the corresponding cam surfaces 102, 104 of the collet head 100 inwardly, thereby closing the collet head 100 and reducing the diameter of the order hole 106.

As illustrated in FIGS. 1 and 4, the cap 140 includes two tabs 150 that extend radially-inwardly from at or near the rearward face 140a of the cap 140 and form forwardly-facing surfaces 152. As illustrated in FIG. 4A, the tabs 150 are preferably disposed on opposite sides of the cap 140 relative to the axis 24. Each tab 150 preferably extends over slightly less than a quarter of the circumference of the cap 140 (i.e., over slightly less than a 90 degree arc). Consequently, circumferential gaps between the tabs 150 each extend over slightly larger than 90 degree arcs around the circumference of the cap 140.

Figure 1A:
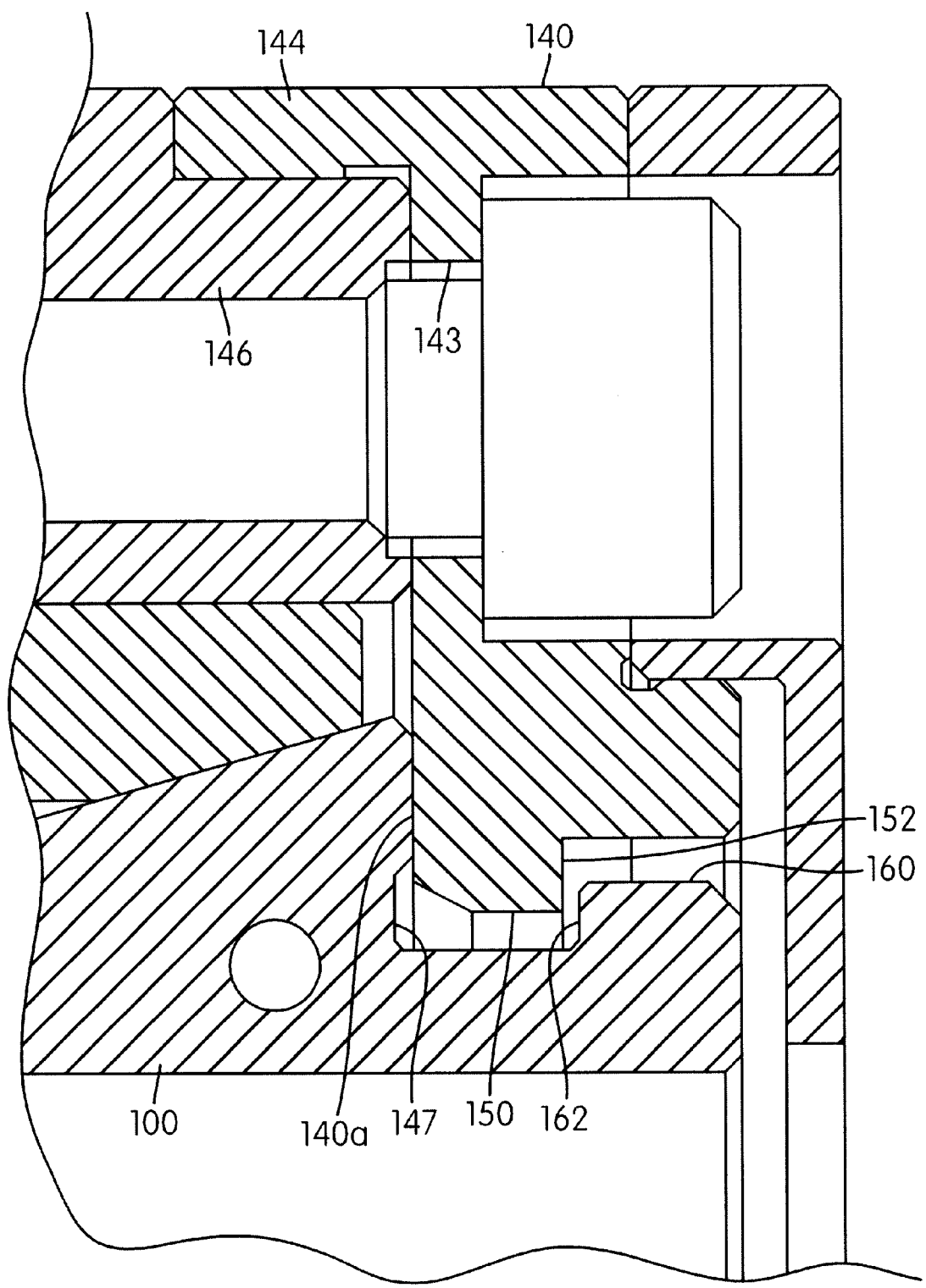
FIG. 1A is an enlarged detail view of FIG. 1.

Each segment 110, 112, 114, 116 includes a radially-outwardly extending raised lip 160 that preferably extends circumferentially over slightly less than half of the 90 degree arc formed by each segment 110, 112, 114, 116 (i.e., slightly less than a 45 degree arc). As illustrated in FIG. 3, the lips 160 generally combine in the collet head 100 to form two opposing lips having arc lengths slightly less than 90 degrees each. As illustrated in FIG. 1A, each lip 160 includes a rearwardly-facing surface 162 that mates with one of the forwardly-facing surfaces 152 of the tabs 150 to prevent the collet head 100 from moving rearwardly with the sleeve 40 when the sleeve 40 is moved axially-rearwardly to open the collet head 100. Because the pitch of the cam surfaces 44, 46, 102, 104 is small, the collet head 100 tends to stick to the sleeve 40 when the collet head 100 is closed. The tabs 150 and lips 160 are therefore employed to ensure that the collet head 100 opens properly without moving axially.

The tabs 150, lips 160, rearwardly-facing surfaces 162, and forwardly-facing surfaces 146, 152 are all preferably disposed axially-forwardly from a forward end of the collet closing sleeve 40. Consequently, the collet closing sleeve 40 does not interfere with the engagement between the lips 160 and tabs 150.

To engage the tabs 150 with the lips 160 during assembly of the collet chuck assembly 10, the cap 140 is first axially pushed against the collet head 100 in a rotational position in which the tabs 150 and lips 160 are not aligned (i.e., the tabs 150 are rotationally aligned with the gaps between the lips 160 and vice versa). At this point, the rearward surface 140a of the cap 140 mates with the forward surface 146 of the collet head 100. The cap 140 is then rotated 90 degrees relative to the collet head 100 about the axis 24 to engaged the forward surface 152 of the cap 140 with the rearward surface 162 of the collet head 100.

As illustrated in FIG. 1A, the forwardly-facing surfaces 152 of the tabs 150 of the cap 140 and rearwardly-facing surfaces 162 of the lips 160 ensure that the collet head 100 cannot significantly move rearwardly within the collet chuck assembly 10. Similarly, the forwardly-facing surfaces 147 of the segments 110, 112, 114, 116 and the rearwardly-facing surface 140a of the cap 140 ensure that the collet head 100 cannot significantly more forwardly within the collet chuck assembly 10. This ensures that every workpiece/tool that is clamped within the assembly 10 is clamped at precisely the same axial position as every other workpiece/tool, regardless of variations in the diameter of various workpieces.

It should be noted that if the collet head 100 includes greater or fewer than four segments, the arc lengths and quantities of the tabs 150 and lips 160 may change accordingly. For example, if two 180 degree segments are used, a single tab and a single lip may be used. In such a case, the lip and tab would preferably extend over arcs that cover at least slightly less than 180 degrees each. Regardless of the number or size of segments, tabs, and lips, it is preferred that at least a portion of a lip on each segment engage at least a portion of a tab on the cap when the cap engages the collet head so that each segment is individually prevented from moving axially relative to the cap.

When the cap 140 is removed, the collet head 100 may be easily removed and replaced by moving it axially forward out of the assembly 10. The combination of the quick-change cap 140 and easily removable collet head 100 makes the collet chuck assembly 10 versatile because the collet head 100 may be easily and quickly exchanged with a different sized collet head 100.

As illustrated in FIGS. 1, 4A, and 4B, the cap 140 preferably includes a plurality of circumferentially-spaced slinger bores 170 that extend radially-outwardly from the inner surface 140a of the cap 140 to an outer surface 171 of the cap 140. The bores 170 also preferably extend axially-forwardly as they extend outwardly. The inner end of each slinger bore 170 opens into an interior area of the assembly 10 that preferably includes the space between the collet head 100 and the mount 20, and more preferably the space between the collet head 100 and the sleeve 40. The slinger bore 170 cleans the assembly 10 because centrifugal forces that develop when the assembly 10 turns tend to force chips and other debris in the assembly 10 out through the slinger bore 170. The outer end of the slinger bore 170 may open to either the ambient environment or a space within the assembly 10 that is separated from the moving components of the assembly 10. In the illustrated embodiment, the slinger bores 170 open into the ambient environment forward of the assembly 10. When the slinger bores 170 are not being used, slinger plugs, which are preferably made of nylon, may be fit into the bores 170 to prevent debris from entering the assembly 10 through the bore 170.

As illustrated in FIG. 1, a cover 180 is attached to the forward end 171 of the cap 140 with bolts 182 that thread into bolt holes 183 in the cap 140. Because the cover 180 includes a hole through which the bolts 142 are accessible, the cap 140 may be attached and detached without removing the cover 180 from the cap 140. A hole 184 formed in the cover 180 is axially aligned with the order hole 106. The hole 184 preferably has a diameter that is slightly larger than the largest possible diameter of the order hole 106 so that the cover 180 does not interfere with the ability of a large workpiece/tool to be fit into and held within the order hole 106.

A resilient annular face seal 188 is clamped between the cover 180 and the cap 140. The face seal 188 preferably comprises rubber and has an inside diameter that is slightly smaller than the diameter of the workpiece/tool and order hole 106. The cover 180 and face seal 188 cover a gap formed between the forward ends of the collet head 100 and cap 140 to prevent debris/chips from entering the collet chuck assembly 10 through the gap. The face seal 188 further aids in preventing chips/debris from entering the collet chuck assembly 10 by wiping the sides of the workpiece/tool as the workpiece/tool is inserted into the order hole 106 through the inner hole of the face seal 188.

As illustrated in FIG. 1, the cover 180 mates flushly with the forward surface 171 of the cap 140 such that the cover 180 blocks the forward openings of the slinger bores 170 when the cover is attached to the cap 140. Consequently, the cover 180 and seal 188 are typically not used to keep the assembly 10 clean when the slinger bores 170 are being used to clean the collet chuck assembly 10 and vice versa. Thus, when the cover 180 and seal 188 are used, a slinger plug is inserted into each bore 170 before attaching the cover 180 and seal 188.

While the illustrated embodiment is an inwardly-clamping outside-diameter (OD) collet chuck assembly 10, outwardly-clamping inside-diameter (ID) collet chuck assemblies are also intended to be included within the scope of the present invention unless otherwise stated.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A collet chuck assembly for holding a tool or workpiece on a spindle of a turning machine, the collet chuck assembly comprising:
    a mount having a front portion and a rear portion adapted to be connected to the spindle, the mount having an axial opening extending therethrough;
    an axially-extendable collet closing sleeve disposed within the axial opening of the mount, the collet closing sleeve having a first cam surface;
    a radially-expandable collet head comprising
        a second cam surface engaging the first cam surface, and
        at least one lip having a third surface; and
    a cap mounted to the front portion of the mount and engaging the collet head to prevent the collet head from moving axially-forwardly, the cap having at least one tab having a fourth surface that engages the third surface of the lip of the collet head to prevent the collet head from moving axially-rearwardly,
    wherein the fourth surface of the at least one tab and the third surface of the at least one lip are disposed axially forward from a forward portion of the sleeve.

2. The collet chuck assembly of claim 1, wherein the at least one lip and tab each extend over less than a 180 degree arc, whereby the fourth surface of the tab engages the third surface of the lip when the cap is fit onto the collet head at a rotational position in which the tab and lip arc shapes are offset from each other, and the cap is subsequently rotated relative to the collet head.

3. The collet chuck assembly of claim 2 wherein the cap is a quick-change cap.

4. The collet chuck assembly of claim 2, wherein the third surface faces rearwardly, and wherein the fourth surface faces forwardly.

5. The collet chuck assembly of claim 1, wherein the at least one lip comprises two lips, and wherein the at least one tab comprises two tabs.

6. A The collet chuck assembly of claim 1, wherein the collet head comprises a plurality of circumferential segments, each segment of which defines a portion of the second cam surface, each segment having surface portions disposed adjacent to corresponding surface portions of adjacent segments.

7. The collet chuck assembly of claim 6, wherein at least a portion of the at least one lip is defined by each segment such that each segment engages the cap and is prevented from moving axially relative to the cap.

8. The collet chuck assembly of claim 7, wherein the at least one lip comprises two lips, and wherein the at least one tab comprises two tabs, and wherein the plurality of segments comprises four segments.

9. A collet chuck assembly comprising:
    a mount having a front portion and a rear portion adapted to be connected to a spindle, the mount having an axial opening extending therethrough;
    a collet closing sleeve disposed within the axial opening of the mount;
    a collet head disposed radially-inwardly from the collet closing sleeve, the collet head defining an inner order hole; and
    a cap mounted to the front portion of the mount, the cap including a radially-extending slinger bore that opens into a space between the collet head and the mount,
    wherein the slinger bore is adapted to direct debris outwardly out of the space between the mount and the collet head.

* * * * *